(12) United States Patent  
Sun et al.

(10) Patent No.: US 12,199,509 B2  
(45) Date of Patent: Jan. 14, 2025

(54) BIDIRECTIONAL DIGITAL SWITCHING POWER AMPLIFIER AND MULTI-STEP CURRENT PREDICTION CONTROL METHOD THEREOF

(71) Applicant: SHENYANG UNIVERSITY OF TECHNOLOGY, Liaoning (CN)

(72) Inventors: Feng Sun, Liaoning (CN); Fangchao Xu, Liaoning (CN); Junjie Jin, Liaoning (CN); Gaojie Song, Liaoning (CN); Li Chen, Liaoning (CN); Ming Zhang, Liaoning (CN); Ling Tong, Liaoning (CN); Qiang Li, Liaoning (CN); Xiaoyou Zhang, Liaoning (CN)

(73) Assignee: SHENYANG UNIVERSITY OF TECHNOLOGY, Liaoning (CN)

( * ) Notice: Subject to any disclaimer, the term of this patent is extended or adjusted under 35 U.S.C. 154(b) by 248 days.

(21) Appl. No.: 17/926,693

(22) PCT Filed: May 19, 2021

(86) PCT No.: PCT/CN2021/094681  
§ 371 (c)(1),  
(2) Date: Nov. 21, 2022

(87) PCT Pub. No.: WO2021/233350  
PCT Pub. Date: Nov. 25, 2021

(65) Prior Publication Data  
US 2023/0208292 A1 Jun. 29, 2023

(30) Foreign Application Priority Data  
May 21, 2020 (CN) .......................... 202010433364.4

(51) Int. Cl.  
*H02M 3/157* (2006.01)  
*H02M 1/00* (2006.01)  
(Continued)

(52) U.S. Cl.  
CPC ......... *H02M 3/157* (2013.01); *H02M 1/0009* (2021.05); *H02M 3/158* (2013.01); *H02M 1/088* (2013.01)

(58) Field of Classification Search  
CPC .... H02M 3/157; H02M 3/158; H02M 1/0009; H02M 1/088  
See application file for complete search history.

(56) References Cited

U.S. PATENT DOCUMENTS

| | | | | |
|---|---|---|---|---|
| 2008/0042631 A1* | 2/2008 | Wong | ................ | H02M 7/1555 323/283 |
| 2008/0055940 A1* | 3/2008 | Lawson | ................ | G05F 1/10 363/75 |
| 2017/0281972 A1* | 10/2017 | Zhang | ................ | A61B 6/06 |

FOREIGN PATENT DOCUMENTS

| | | |
|---|---|---|
| CN | 106208744 A | 12/2016 |
| CN | 109217363 A | 1/2019 |

(Continued)

OTHER PUBLICATIONS

Office Action dated Apr. 5, 2023 in related/corresponding Chinese Application No. 202010433364.4.

(Continued)

*Primary Examiner* — Rafael O De Leon Domenech  
(74) *Attorney, Agent, or Firm* — PATENT PORTFOLIO BUILDERS PLLC

(57) ABSTRACT

The present application relates to a bidirectional digital switching power amplifier based on a magnetic suspension drive platform and its multi-step current predictive control method. The control method includes the following steps: establishing a prediction model of a bidirectional digital switching power amplifier; introducing a feedback correction term for a closed loop prediction; calculating an optimal modulation duty cycle through a value function; generating, according to the obtained modulation duty cycle, four PWM (Continued)

drive signals by a pulse width modulation module to control four switch tubes respectively to achieve current prediction control. The present application effectively improves the system control accuracy with small steady-state error, small on-line computation amount, simple algorithm, easy digital realization, and good practical value and application prospect.

9 Claims, 5 Drawing Sheets

(51) Int. Cl.
*H02M 3/158* (2006.01)
*H02M 1/088* (2006.01)

(56) References Cited

FOREIGN PATENT DOCUMENTS

| CN | 109981056 A | 7/2019 |
|---|---|---|
| CN | 110176867 A | 8/2019 |
| CN | 111669053 A | 9/2020 |

OTHER PUBLICATIONS

Rusong Wu et al., "A PWM AC to DC Converter with Fixed Switching Frequency," Oct. 1990, IEEE Transactions on Industry Applications, pp. 706-711.

Xiao Chang et al., "Digital Power Amplifier of Active Magnetic Bearing," Journal of Mechanical Engineering, Oct. 2010, vol. 46, No. 10, pp. 9-14, including English language abstract.

Bingda Zhang et al., "A Current Digital Power Amplifier Based on Self-Adaptive Predictive Control," Transactions of China Electrotechnical Society, Aug. 25, 2015, pp. 162-167, vol. 30, No. 16, including English language abstract.

Hongwei Ma et al., "PWM Rectifier Using a Model Predictive Control Method in the Current Loop," Transactions of China Electrotechnical Society, Aug. 26, 2014, pp. 136-141, vol. 29, No. 8, including English language abstract.

International Search Report/Written Opinion dated Aug. 9, 2021 in related/corresponding PCT Application No. PCT/CN2021/094681, including partial English translation.

* cited by examiner

BIDIRECTIONAL DIGITAL SWITCHING POWER AMPLIFIER AND MULTI-STEP CURRENT PREDICTION CONTROL METHOD THEREOF

The present application claims the priority to a Chinese patent application No. 202010433364.4, filed with the China National Intellectual Property Administration on May 21, 2020 and entitled "Bidirectional digital switching power amplifier and multi-step current prediction control method thereof", which is incorporated herein by reference in its entirety.

TECHNICAL FIELD

The present application relates to the field of voltage-current mode digital switching power amplifier control, in particular to a bidirectional digital switching power amplifier based on a magnetic suspension drive platform and multi-step current prediction control method thereof.

BACKGROUND

PI (Proportional Integration) controller is the most widely used controller for bidirectional digital switching power amplifier used in magnetic suspension drive platform. PI controller needs to repeatedly adjust Kp (proportional coefficient) and Ki (integral coefficient) parameters to adapt current control requirements. The tuning process is difficult, the parameter adaptation range is small, the dynamic adjustment time is long, and the system robustness is poor, parameter setting and debugging have certain risks in high power applications.

Model predictive control is a finite time domain optimal control mode, which can predict the state of the system in a future finite time domain and determine a control output of the system at the current moment. However, traditional model predictive control requires adjustment of cumbersome weight coefficients, and the adjustment of weight coefficients depends on experience, and there is a large amount of on-line computation, and it is difficult to apply in the occasion of high switching frequency, such as switching power amplifier.

SUMMARY

The application provides a bidirectional digital switching power amplifier suitable for a magnetic suspension drive platform and its multi-step current predictive control method, which aims to solve the problems of long dynamic adjustment time, poor system robustness, large amount of on-line computation in the above control technology, and without the need to set complex parameters and adjust complex weight coefficients. Specifically, the technical solutions are as follows.

In a first aspect, an embodiment of the present application provides a multi-step current predictive control method of a bidirectional digital switching power amplifier, which includes the following steps:

step 1, establishing a prediction model of a bidirectional digital switching power amplifier, and predicting at a k-th sampling moment, current prediction values at next two sampling moments, k+1-th sampling moment and k+2-th sampling moment;

step 2, introducing a feedback correction term for a closed loop prediction, to obtain corrected current prediction values at the k+1-th sampling moment and k+2-th sampling moment;

step 3, calculating an optimal modulation duty cycle through a value function according to a current reference value of the bidirectional digital switching power amplifier at the k-th sampling moment and the corrected current prediction values at the k+1-th sampling moment and k+2-th sampling moment after introducing the feedback correction term;

step 4, generating, according to the optimal modulation duty cycle obtained in the step 3, four PWM (pulse width modulation) drive signals by a pulse width modulation module to control four switch tubes respectively to achieve current prediction control.

In one possible embodiment, the prediction model in the step 1 is:

$$i(k+1|k) = \left(1 - \frac{T_S}{L}R\right)i(k) + U_o(k)\frac{T_S}{L} \quad (1)$$

wherein, i(k+1|k) is a current value at the k+1-th sampling moment predicted at the k-th sampling moment, i(k) is an output current sampling value at the k-th sampling moment, $T_S$ is a sampling period, L is an inductance of a load, R is a resistance of the load, and $U_o(k)$ is an output voltage of the bidirectional digital switching power amplifier at the k-th sampling moment.

In one possible embodiment, the current prediction values of the two sampling moments (k+1, k+2) in the step 1 are:

$$i(k+1|k) = \left(1 - \frac{T_S}{L}R\right)i(k) + (2D(k)-1)U_{dc}\frac{T_S}{L} \quad (2)$$

$$i(k+2|k) = \left(1 - \frac{T_S}{L}R\right)i(k+1|k) + (2D(k)-1)U_{dc}\frac{T_S}{L} \quad (3)$$

wherein, i(k+1|k) is a current value (A) at the k+1-th sampling moment predicted at the k-th sampling moment, i(k+2|k) is a current value (A) at the k+2-th sampling moment predicted at the k-th sampling moment, i(k) is an output current sampling value (A) at the k-th sampling moment, $T_S$ is a sampling period (s), L is an inductance (H) of a load, R is a resistance (Ω) of the load, $U_{dc}$ is a DC bus voltage (V), and D(k) is a duty cycle of a switch tube at the k-th sampling moment.

In one possible embodiment, the corrected current prediction values at the k+1-th sampling moment and k+2-th sampling moment obtained by introducing the feedback correction term in the step 2 are:

$$i(k+1|k) = \left(1 - \frac{T_S}{L}R\right)i(k) + (2D(k)-1)U_{dc}\frac{T_S}{L} + \lambda_1[i(k) - i(k|k-1)] \quad (4)$$

$$i(k+2|k) = \left(1 - \frac{T_S}{L}R\right)i(k+1|k) + (2D(k)-1)U_{dc}\frac{T_S}{L}\lambda_2[i(k) - i(k|k-1)] \quad (5)$$

wherein, $\lambda_1$, $\lambda_2$ are correction coefficients, i(k+1|k) is a current value (A) at the k-th sampling moment predicted at the k−1-th sampling moment, i(k) is an output current sampling value at the k-th sampling moment, i(k+1|k) is a current value (A) at the k+1-th sampling moment predicted at the k-th sampling moment, i(k+2|k) is a current value (A) at the k+2-th sampling moment predicted at the k-th sampling moment, $T_S$ is a sampling period (s), L is an inductance (H) of a load, R is a resistance (Ω) of the load, $U_{dc}$ is a DC bus voltage (V), and D(k) is a duty cycle of a switch tube at the k-th sampling moment.

In one possible embodiment, the value function in the step 3 is:

$$J=(i^*(k)-i(k+2|k))^2 \qquad (6)$$

wherein i*(k) is a current reference value (A) at k-th moment, and i(k+2|k) is a current value (A) at the k+2-th moment predicted at k-th moment.

In one possible embodiment, the specific process of obtaining the optimal modulation duty cycle in the step 3 is as follows:

firstly, substituting a current prediction value at the k+2-th moment into the value function to obtain:

$$J = (i^*(k)) - \left(1 - \frac{T_S}{L}R\right)i(k+1|k) + (2D(k)-1)U_{dc}\frac{T_S}{L} + \lambda_2[i(k) - i(k|k-1)])^2 \qquad (7)$$

secondly, calculating a derivative of value function J to D:

$$\frac{dJ}{dD} = \frac{d\{(i^*(k)) - \left(1 - \frac{T_S}{L}R\right)i(k+1|k) + (2D(k)-1)U_{dc}\frac{T_S}{L} + \lambda_2[i(k) - i(k|k-1)])^2\}}{dD(k)} \qquad (8)$$

finally, making the derivative of J to D equal to zero, and calculating a duty cycle D as the optimal duty cycle:

$$\frac{dJ}{dD} = 0 \qquad (9)$$

wherein a value range of duty cycle D is $0 \leq D \leq 1$.

In a second aspect, an embodiment of the application provides a bidirectional digital switching power amplifier, which is composed of a current prediction controller, a PWM modulator, a phase shifting circuit, a photoelectric isolation circuit, a driving circuit, a power conversion circuit, a current Hall sensor and a load; an input end of the current prediction controller is connected with a current given signal and a current feedback signal in a load fed back by the current Hall sensor, an output end of the current prediction controller is connected with an input end of the PWM modulator, an output end of the PWM modulator is connected with an input end of the phase shifting circuit, an output end of the phase shifting circuit is connected with an input end of the photoelectric isolation circuit, and an output end of the photoelectric isolation circuit is connected with an input end of the drive circuit, four-channel output ends of the drive circuit are respectively connected to a gate end of a first switch tube S1, a gate end of a second switch tube S2, a gate end of a third switch tube S3, and a gate end of a fourth switch tube S4, a drain end of the first switch tube S1 is simultaneously connected to a drain end of the third switch tube S3 and +$U_{dc}$ bus voltage, a source end of the first switch tube S1 is simultaneously connected to a drain end of the second switch tube S2 and one end of the current Hall sensor, the other end of the current Hall sensor is connected in series with one end of the load, a source end of the third switch tube S3 is simultaneously connected to a drain end of the fourth switch tube S4 and the other end of the load, a source end of the second switch tube S2 is simultaneously connected to a source end of the fourth switch tube S4 and a ground, an output end of the current Hall sensor is connected to the input end of the current prediction controller.

In one possible embodiment, the power conversion circuit is composed of the switch tubes S1, S2, S3 and S4, all of which are MOS (Metal Oxide Semiconductor Field Effect Transistor) tubes or IGBTs (Insulated Gate Bipolar Transistor), drive signals of the switch tubes S1 and S2 are complementary, drive signals of the switch tubes S3 and S4 are complementary, a phase difference of drive signals of the switch tubes S1 and S4 is 180 degrees, and a phase difference of the drive signals of switch tubes S2 and S3 is 180 degrees.

In one possible embodiment, the loads driven by the bidirectional digital switching power amplifier are all inductive loads.

Beneficial Effects

1. The multi-step current predictive control method of the bidirectional digital switching power amplifier used in the magnetic suspension drive platform in the application can effectively improve the dynamic response speed of the system and reduce the dynamic adjustment time compared with the traditional PI control.

2. The multi-step current predictive control method of the bidirectional digital switching power amplifier used in the magnetic suspension drive platform in the application adopts two-step current predictive control, which effectively compensates the single period delay caused by sampling conversion, algorithm calculation and duty cycle update.

3. The multi-step current prediction control method of the bidirectional digital switching power amplifier used in the magnetic suspension drive platform in the application adopts a closed loop current prediction, which effectively improve the system control accuracy.

4. The multi-step current predictive control method of the bidirectional digital switching power amplifier used in the magnetic suspension drive platform in the application has small amount of on-line computation, simple algorithm and easy digital realization.

5. The multi-step current predictive control method of the bidirectional digital switching power amplifier used in the magnetic suspension drive platform does not need to set complex parameters and adjust complex weight coefficients.

BRIEF DESCRIPTION OF THE DRAWINGS

In order to more clearly describe the technical solution of the embodiments of the application and the prior art, drawings needed in the embodiments and the prior art will be briefly described below. Obviously, the drawings described below are for only some embodiments of the present application, one of ordinary skills in the art can also obtain other drawings based on these drawings without any creative efforts.

DETAILED DESCRIPTION

Figure 1:
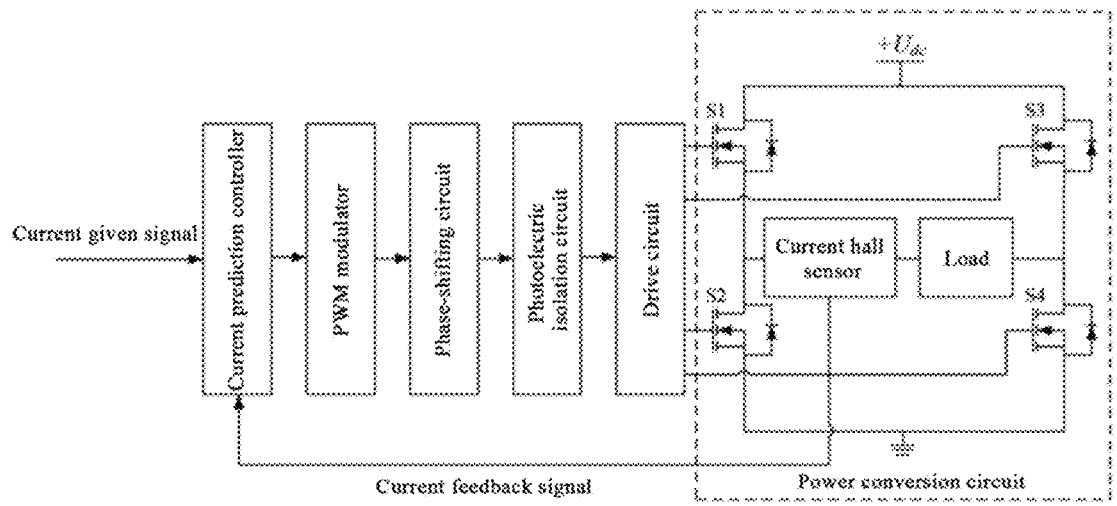
FIG. 1 is a schematic diagram of a bidirectional digital switching power amplifier.

In order to make objectives, technical solutions and advantages of the present application more apparent, the present application now will be described in detail with reference to the accompanying drawings and the detailed description. Obviously, the embodiments described are only some of the embodiments of the present application instead of all the embodiments. All further embodiments obtained by those of ordinary skills in the art based on the embodiments herein without any creative efforts are within the scope of the present application.

The present application provides a multi-step current predictive control method of a bidirectional digital switching power amplifier based on magnetic suspension drive platform, which includes the following steps:

step 1, establishing a prediction model of a bidirectional digital switching power amplifier, and predicting at a k-th sampling moment, current prediction values at next two sampling moments, k+1-th sampling moment and k+2-th sampling moment;

where k is a positive integer. The establishment manner of the prediction model of the bidirectional digital switching power amplifier can refer to the establishment of the prediction model in related technologies. In an example, the prediction model can be expressed by the following formula:

$$i(k+1 \mid k) = \left(1 - \frac{T_S}{L}R\right)i(k) + U_o(k)\frac{T_S}{L} \quad (1)$$

The established prediction model of the bidirectional digital switching power amplifier is used to predict current prediction values at the k+1-th moment and the k+2-th moment according to data collected at the k-th sampling moment.

In one example, the current prediction value at the k+1-th moment can be predicted first, and then the current prediction value at the k+2-th moment can be predicted using the current prediction value at the k+1-th moment.

step 2, introducing a feedback correction term for a closed loop prediction, to obtain corrected current prediction values at the k+1-th and k+2-th moments;

The corrected current prediction values at the k+1-th and the k+2-th moments are obtained by correcting the current prediction values at the k+1-th and the k+2-th moments. Here, the correction is to compensate for the influence of factors such as model mismatch and random interference, the feedback correction term can be introduced to realize correction.

step 3, calculating an optimal modulation duty cycle through a value function according to a current reference value of the bidirectional digital switching power amplifier at the k-th sampling moment and the corrected current prediction values at the k+1-th sampling moment and k+2-th sampling moment after introducing the feedback correction term;

The current reference value is the expected output current value, which can be customized according to actual situation. The current prediction values at the k+1-th and the k+2-th sampling moments after introducing the feedback correction term are the corrected current prediction values at the k+1-th and the k+2-th moments obtained in step 2; the value function is used to represent an error between a prediction value and an actual value. In one example, the value function selects the square of the difference between a current reference value at k-th moment and a current prediction value at k+2-th moment.

Step 4, generating, according to the optimal modulation duty cycle obtained in the step 3, four PWM (pulse width modulation) drive signals by a pulse width modulation module to control four switch tubes respectively to achieve current predictive control.

The multi-step current predictive control method of the bidirectional digital switching power amplifier used in the magnetic suspension drive platform in the present application, compared with the traditional PI control, can effectively improve the system dynamic response speed and reduces the dynamic adjustment time, adopts two-step current predictive control to effectively compensate the single period delay caused by sampling conversion, algorithm calculation and duty cycle update; which adopts a closed loop current prediction to effectively improve the system control accuracy with small on-line computation amount, simple algorithm, easy digital realization, and there is no need to set complex parameters and adjust complex weight coefficients.

As shown in FIG. 1, the bidirectional digital switching power amplifier in an embodiment of the present application can be composed of a current prediction controller, a PWM modulator, a phase shifting circuit, a photoelectric isolation circuit, a driving circuit, a power conversion circuit, a current Hall sensor and a load. An input end of the current prediction controller is connected with a current given signal (that is, the current reference value) and a current feedback signal in a load fed back by the current Hall sensor, an output end of the current prediction controller is connected with an input end of the PWM modulator, an output end of the PWM modulator is connected with an input end of the phase shifting circuit, an output end of the phase shifting circuit is connected with an input end of the photoelectric isolation circuit, and an output end of the photoelectric isolation circuit is connected with an input end of the drive circuit, four-channel output ends of the drive circuit are respectively connected to a gate end of a first switch tube S1, a gate end of a second switch tube S2, a gate end of a third switch tube S3, and a gate end of a fourth switch tube S4, a drain end of the first switch tube S1 is simultaneously connected to a drain end of the third switch tube S3 and +$U_{dc}$ bus voltage, a source end of the first switch tube S1 is simultaneously connected to a drain end of the second switch tube S2 and one end of the current Hall sensor, the other end of the current Hall sensor is connected in series with one end of the load, a source end of the third switch tube S3 is simultaneously connected to a drain end of the fourth switch tube S4 and the other end of the load, a source end of the second switch tube S2 is simultaneously connected to a source end of the fourth switch tube S4 and the ground, an output end of the current Hall sensor is connected to the input end of the current prediction controller. The load is an inductive coil with an inductance of L and a resistance of R. The current prediction controller calculates the optimal duty cycle according to the circuit given signal and the current feedback signal in the load fed back by the current Hall sensor, and then the output control signal controls conduction time and conduction sequence of the four switch tubes through the phase shifting circuit, the photoelectric isolation circuit, and the drive circuit to achieve current prediction control.

Figure 2:
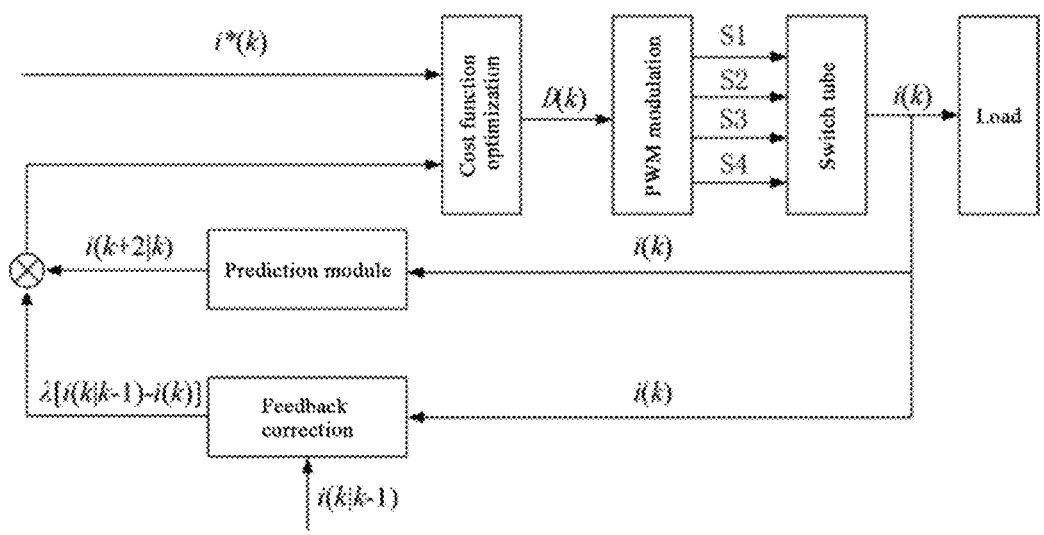
FIG. 2 is a multi-step current predictive control block diagram of a bidirectional digital switching power amplifier used in a magnetic suspension drive platform in the present application.

FIG. 2 shows a multi-step current prediction control block diagram of a bidirectional digital switching power amplifier used for the magnetic suspension drive platform of the present application. The multi-step current prediction control method of the bidirectional digital switching power amplifier used for the magnetic suspension drive platform of the present application specifically includes the following steps:

step 1, establishing a prediction model of a bidirectional digital switching power amplifier, and predicting at a k-th sampling moment, current prediction values at next two sampling moments, k+1-th sampling moment and k+2-th sampling moment; the voltage relationship of power conversion circuit in FIG. 2 can be obtained from Kirchhoff voltage law, and the prediction model of the bidirectional digital switching power amplifier can be obtained after discretization:

$$i(k+1 \mid k) = \left(1 - \frac{T_S}{L}R\right)i(k) + U_o(k)\frac{T_S}{L} \quad (1)$$

wherein, i(k+1|k) is a current value (A) at the k+1-th moment predicted at the k-th moment, i(k) is the output current sampling value (A) at the k-th moment, $T_S$ is a sampling period (s), L is an inductance (H) of a load, R is a resistance (Ω) of the load, and $U_o(k)$ is the output voltage (V) of the bidirectional digital switching power amplifier at the k-th moment.

According to the prediction model, the current prediction values at the next two sampling moments (k+1, k+2) are predicted at the current k-th sampling moment;

$$i(k+1 \mid k) = \left(1 - \frac{T_S}{L}R\right)i(k) + (2D(k)-1)U_{dc}\frac{T_S}{L} \quad (2)$$

$$i(k+2 \mid k) = \left(1 - \frac{T_S}{L}R\right)i(k+1 \mid k) + (2D(k)-1)U_{dc}\frac{T_S}{L} \quad (3)$$

Wherein, i(k+1|k) is the current value (A) at the k+1-th moment predicted at the k-th moment, i(k+2|k) is the current value (A) at the k+2-th moment predicted at the k-th moment, i(k) is the output current sampling value (A) at the k-th moment, $T_S$ is the sampling period (s), L is the inductance (H) of the load, R is the resistance (Ω) of the load, $U_{dc}$ is a DC bus voltage (V), and D (k) is a duty cycle of a switch tube at the k-th moment.

Step 2, introducing a feedback correction term for a closed loop prediction, to correct the current prediction value in real time, reduce the prediction output error, compensate for the influence of factors such as model mismatch and random interference, enhance the robustness of the system, and improve the control effect. The introduced feedback correction term is obtained by the difference between the current prediction value at k-th moment and the actual output current sampling value, $$\lambda[i(k)-i(k \mid k-1)].$$

wherein λ is the correction coefficient, i(k+1|k) is a current value (A) at the k-th moment predicted at the k−1-th moment, and i(k) is the output current sampling value (A) at the k-th moment.

The corrected current prediction values at the k+1-th and the k+2-th moments after introducing the feedback correction term are $$i(k+1 \mid k) = \left(1 - \frac{T_S}{L}R\right)i(k) + (2D(k)-1)U_{dc}\frac{T_S}{L} + \lambda_1[i(k) - i(k \mid k-1)] \quad (4)$$

$$i(k+2 \mid k) = \quad (5)$$
$$\left(1 - \frac{T_S}{L}R\right)i(k+1 \mid k) + (2D(k)-1)U_{dc}\frac{T_S}{L} + \lambda_2[i(k) - i(k \mid k-1)]$$

wherein $\lambda_1$, $\lambda_2$ are the correction coefficients, i(k|k−1) is the current value (A) at the k-th moment predicted at the k−1-th moment, and i(k) is the output current sampling value (A) at k-th moment.

The purpose for controlling is to minimize the error between the current reference value and the actual output current value, and the actual output current value can stably track the current reference value. When the sampling period is small, the current reference value at k+2-th moment can be approximately equal to the current reference value at k-th moment. When the current prediction value at the k+2-th moment is equal to the actual output current value at k+2-th moment, it indicates that the current prediction effect is accurate, Therefore, the value function selects the square of the difference between the current reference value at k-th moment and the current prediction value at k+2-th moment to obtain:

$$J=(i^*(k)-i(k+2 \mid k))^2 \quad (6)$$

Wherein i*(k) is the current reference value (A) at k-th moment, and i(k+2|k) is the current value (A) of the k+2-th moment predicted at k-th moment.

step 3, calculating an optimal modulation duty cycle through a value function according to a current given value of the bidirectional digital switching power amplifier at the current time and the current prediction values after introducing the feedback correction term, the calculating process is as follows:

firstly, substituting the current prediction value of the k+2-th moment into the value function to obtain:

$$J = (i^*(k)) - \left(1 - \frac{T_S}{L}R\right)i(k+1 \mid k) + (2D(k)-1)U_{dc}\frac{T_S}{L} + \lambda_2[i(k) - i(k \mid k-1)])^2 \quad (7)$$

secondly, calculating a derivative of value function J to D:

$$\frac{dJ}{dD} = \frac{d\{(i^*(k)) - \left(1 - \frac{T_S}{L}R\right)i(k+1 \mid k) + (2D(k)-1)U_{dc}\frac{T_S}{L} + \lambda_2[i(k) - i(k \mid k-1)])^2\}}{dD(k)} \quad (8)$$

finally, making the derivative of the value function J to D equal to zero, and calculating the duty cycle D. Since i(k+1|k) is a linear function of D (k), and D (k) is a linear function of J, making the derivative of J to D equal to zero, there must be a unique solution, and the calculated D is the minimum value point of the value function, that is, the optimal duty cycle:

$$\frac{dJ}{dD} = \frac{d\{(i^*(k)) - \left(1 - \frac{T_S}{L}R\right)i(k+1\mid k) + (2D(k)-1)U_{dc}\frac{T_S}{L} + \lambda_2[i(k) - i(k\mid k-1)])^2\}}{dD(k)} = 0 \quad (9)$$

wherein the value range of duty cycle D is $0 \leq D \leq 1$.

Step 4, generating, according to the optimal modulation duty cycle, four PWM drive signals by a pulse width modulation module to control conduction time and conduction sequence of four switch tubes respectively to achieve current prediction control.

Figure 3:
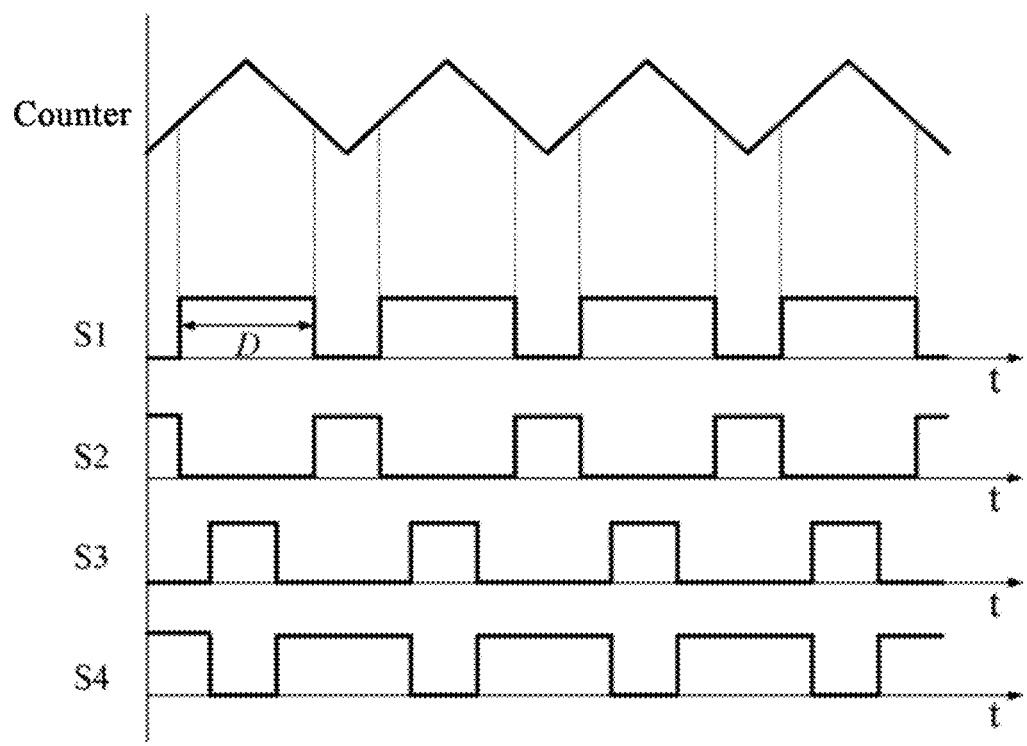
FIG. 3 is a driving waveform diagram of four switch tubes in a power conversion circuit of the bidirectional digital switching power amplifier.

FIG. 3 shows a driving waveform diagram of four switch tubes in the power conversion circuit of the bidirectional digital switching power amplifier. The optimal duty cycle obtained in step 4 is used as the duty cycle of the switch tube S1 to drive the switch tube S1. The drive signal of the switch tube S2 is complementary to that of the switch tube S1. The drive signals of the switch tube S3 and the switch tube S4 are obtained by shifting the drive signals of the switch tube S2 and the switch tube S1 by 180 degrees, which can also be understood as phase shifting ½ cycle.

The loads driven by the bidirectional digital switching power amplifier used in the magnetic suspension drive platform are all inductive loads with fixed switching frequency.

Figure 4:
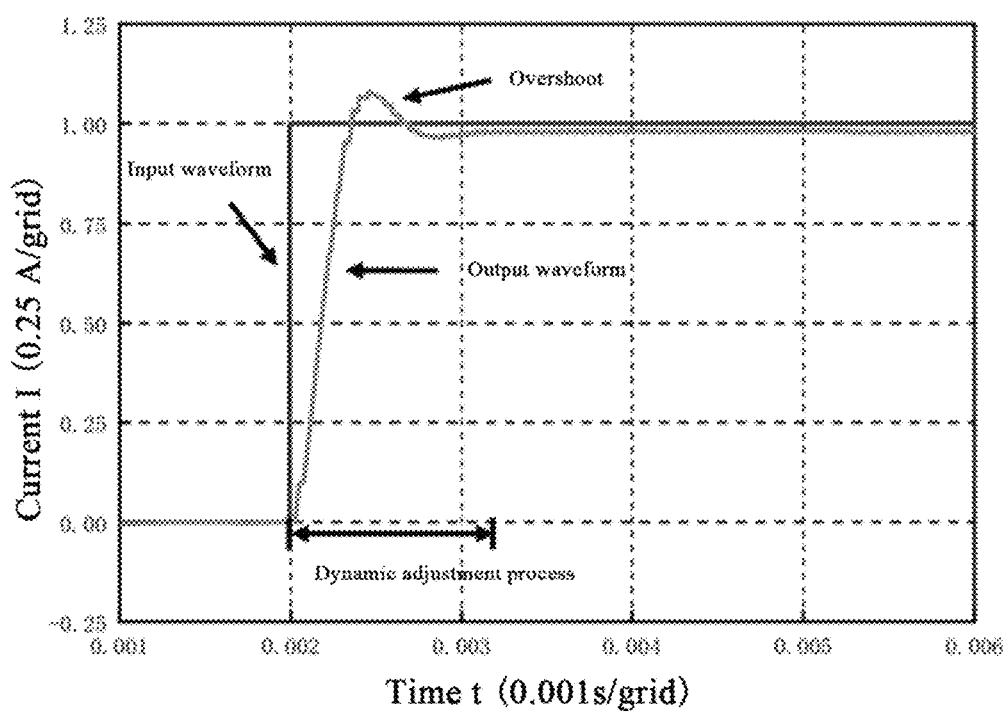
FIG. 4 is a step simulation waveform diagram of power amplifier output 1 A current using PI control.
Figure 5:
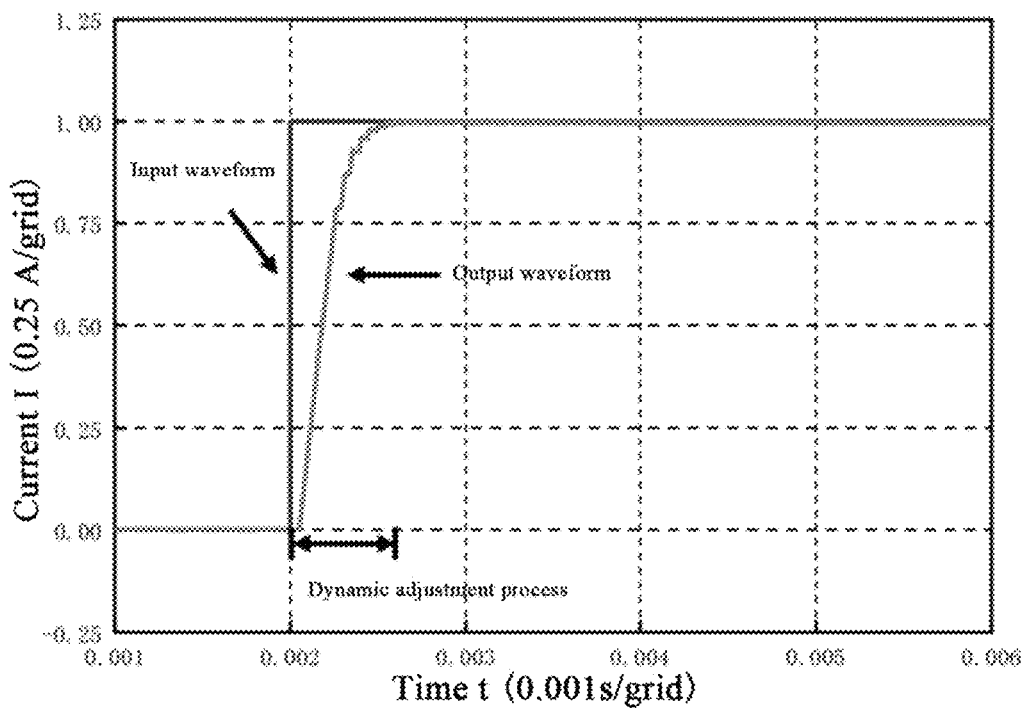
FIG. 5 is a step simulation waveform diagram of power amplifier output 1 A current using the control method of the present application.
Figure 6:
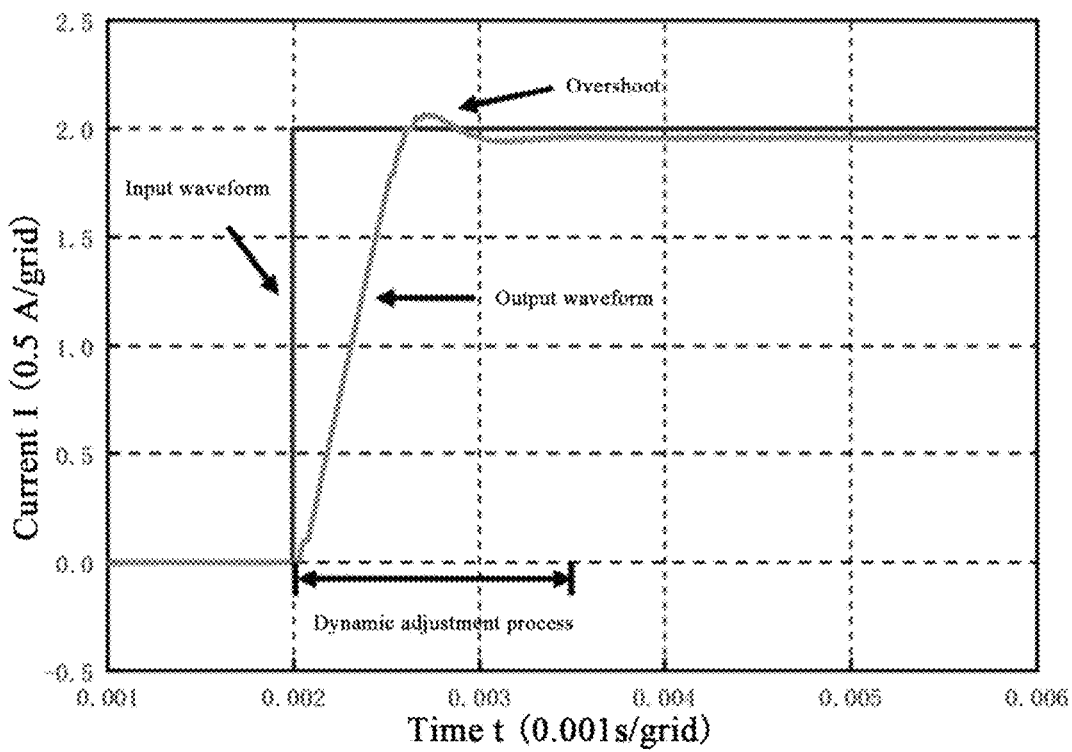
FIG. 6 is a step simulation waveform diagram of power amplifier output 2 A current using PI control.
Figure 7:
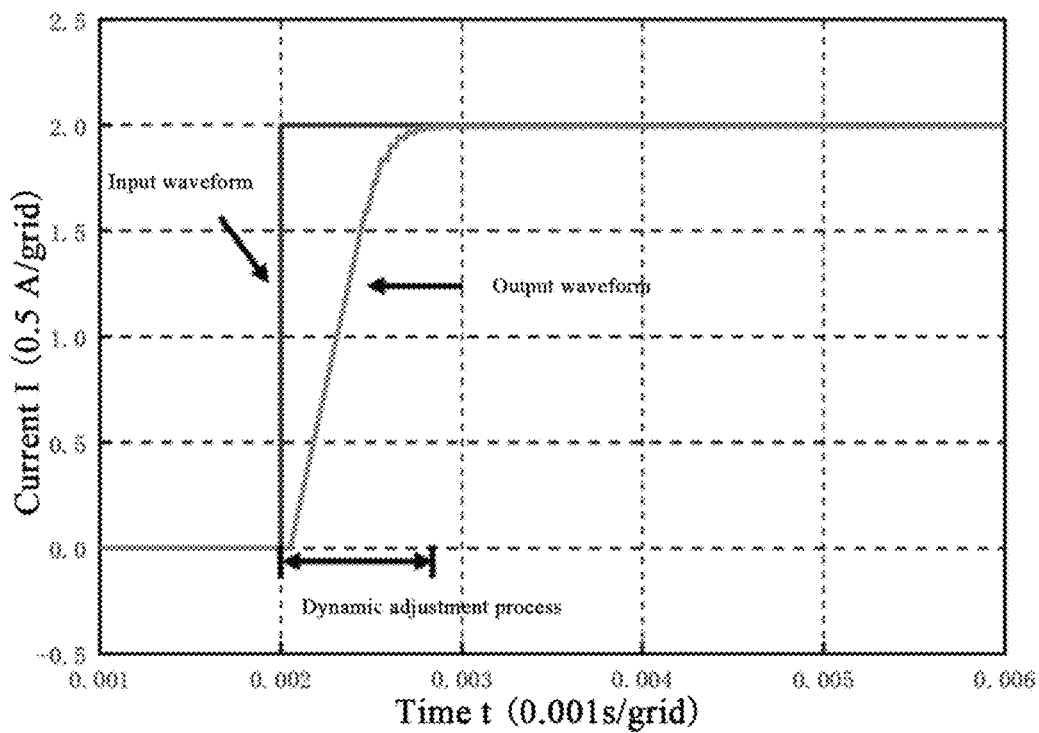
FIG. 7 is a step simulation waveform diagram of power amplifier output 2 A current using the control method of the present application.
Figure 8:
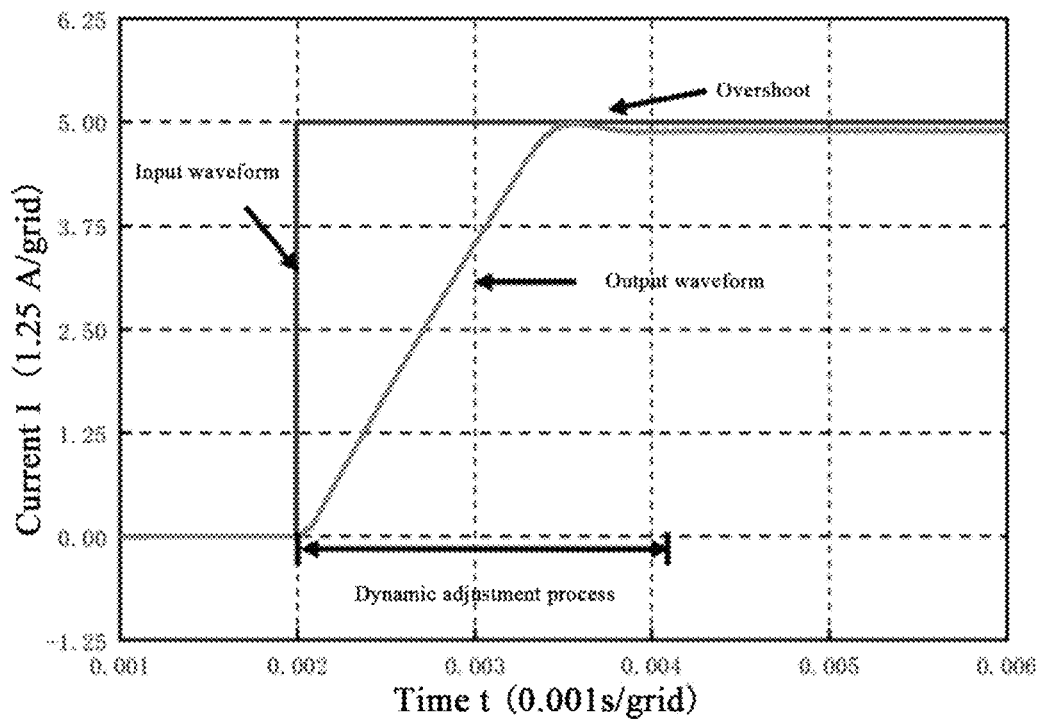
FIG. 8 is a step simulation waveform diagram of power amplifier output 5 A current using PI control.
Figure 9:
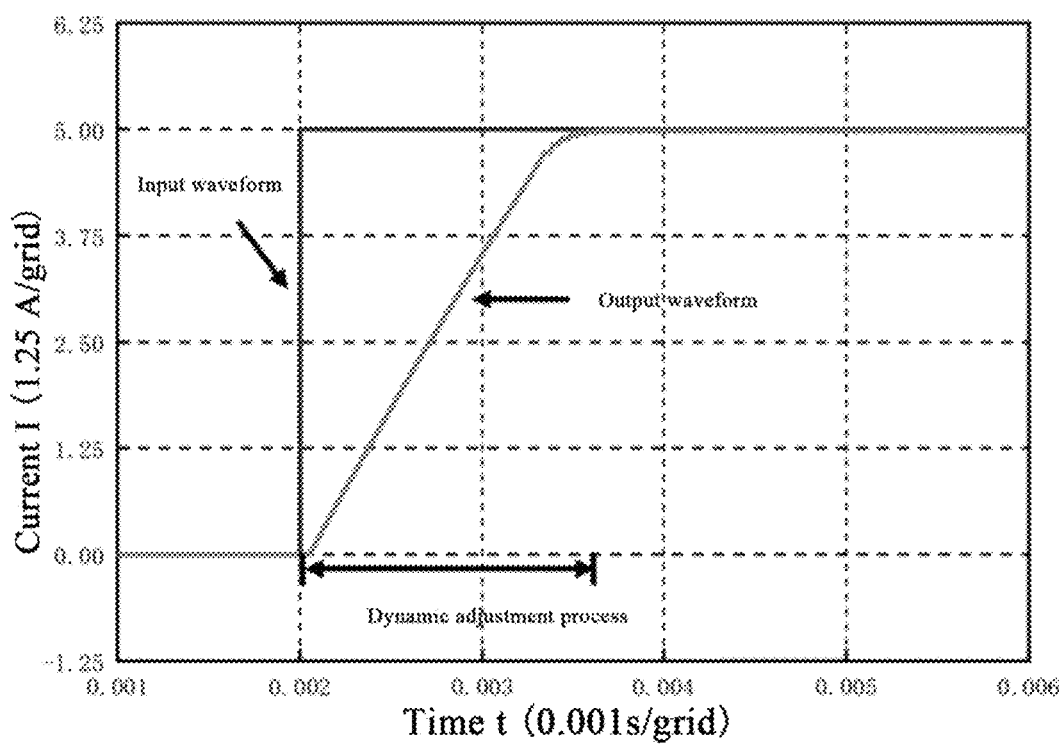
FIG. 9 is a step simulation waveform diagram of power amplifier output 5 A current using the control method of the present application.

In order to verify the beneficial effect of the control method of the present application, the simulation models of switching power amplifiers using the control method of the present application and the traditional PI control method are built respectively in Matlab/simulink. The simulation parameters are: bus voltage of 70V, switch tube switching frequency of 20 KHz, coil inductance of 9 mH, coil internal resistance of 1.65Ω, step signals of 1 A, 2 A, 5 A are input respectively at 2 ms. FIG. 4 shows a step response waveform of power amplifier output 1 A current under PI control, the dynamic adjustment time is about 1.2 ms, the output current is 0.98 A when it is stable, and the steady-state error is 2%. FIG. 5 shows a step response waveform of the power amplifier output 1 A current under the control method of the present application, the dynamic adjustment time is about 0.6 ms, the output current is 0.997 A when it is stable, and the steady-state error is 0.3%. FIG. 6 shows a step response waveform of the power amplifier output 2 A current under PI control, the dynamic adjustment time is about 1.5 ms, the output current is 1.958 A when it is stable, and the steady-state error is 2.1%. FIG. 7 shows a step response waveform of the power amplifier output 2 A current under the control method of the present application, the dynamic adjustment time is about 0.8 ms, the output current is 1.994 A when it is stable, and the steady-state error is 0.3%. FIG. 8 shows a step response waveform of the power amplifier output 5 A current under PI control, the dynamic adjustment time is about 2.1 ms, the output current is 4.89 A when it is stable, and the steady-state error is 2.2%. FIG. 9 shows a step response waveform of the power amplifier output 5 A current under the control method of the present application, the dynamic adjustment time is about 1.6 ms, the output current is 4.984 A when it is stable, and the steady-state error is 0.32%. It can be seen that when the same current level is output under the same condition, the control method in the present application has shorter dynamic adjustment time and higher steady-state accuracy than the traditional PI control.

The present application applies to the multi-step current predictive control method of the bidirectional digital switching power amplifier used for the magnetic suspension drive platform. Compared with the PI control adopted by the switching power amplifier in the prior art, this control method can effectively reduce the dynamic adjustment time of the system, improve the current response speed of the power amplifier, do not need to set complex parameters, and avoid the risks of PI controller parameter tuning and debugging in high-power applications.

The multi-step current predictive control method of the bidirectional digital switching power amplifier used in the magnetic suspension drive platform of the present application adopts a closed loop current prediction, which effectively improves the system control accuracy with small steady-state error, which adopts the two-step current predictive control, which effectively compensates the single period delay caused by sampling conversion, algorithm calculation and duty cycle update with small on-line computation amount, simple algorithm, easy digital realization, and good practical value and application prospect The description is only for preferred embodiments of the present application, and embodiments are not so limited. Any modifications, substitutions, improvements, etc., which are made within the spirit and principles of the present application, will fall into the protection scope of the present application.

What is claimed is:

1. A multi-step current predictive control method of a bidirectional digital switching power amplifier, which comprising the following steps:
    step 1, establishing a prediction model of a bidirectional digital switching power amplifier, and predicting at a k-th sampling moment, current prediction values at next two sampling moments, k+1-th sampling moment and k+2-th sampling moment;
    step 2, introducing a feedback correction term for a closed loop prediction, to obtain corrected current prediction values at the k+1-th sampling moment and k+2-th sampling moment;
    step 3, calculating an optimal modulation duty cycle through a value function according to a current reference value of the bidirectional digital switching power amplifier at the k-th sampling moment and the corrected current prediction values at the k+1-th sampling moment and k+2-th sampling moment after introducing the feedback correction term;
    step 4, generating, according to the optimal modulation duty cycle obtained in the step 3, four PWM (pulse width modulation) drive signals by a pulse width modulation module to control four switch tubes respectively to achieve current prediction control.

2. The multi-step current predictive control method of the bidirectional digital switching power amplifier of claim 1, wherein the prediction model in the step 1 is:

$$i(k+1\mid k) = \left(1 - \frac{T_S}{L}R\right)i(k) + U_o(k)\frac{T_S}{L}$$

wherein, i(k+1|k) is a current value at the k+1-th sampling moment predicted at the k-th sampling moment, i(k) is an output current sampling value at the k-th sampling moment, $T_S$ is a sampling period, L is an inductance of a load, R is a resistance of the load, and $U_o(k)$ is an output voltage of the bidirectional digital switching power amplifier at the k-th sampling moment.

3. The multi-step current predictive control method of the bidirectional digital switching power amplifier of claim 1, wherein the current prediction values of the two sampling moments k+1-th sampling moment and k+2-th sampling moment in the step 1 are:

$$i(k+1\mid k) = \left(1-\frac{T_S}{L}R\right)i(k) + (2D(k)-1)U_{dc}\frac{T_S}{L}$$

$$i(k+2\mid k) = \left(1-\frac{T_S}{L}R\right)i(k+1\mid k) + (2D(k)-1)U_{dc}\frac{T_S}{L}$$

wherein, i(k+1|k) is a current value at the k+1-th sampling moment predicted at the k-th sampling moment, i(k+2|k) is a current value at the k+2-th sampling moment predicted at the k-th sampling moment, i(k) is an output current sampling value at the k-th sampling moment, $T_S$ is a sampling period, L is an inductance of a load, R is a resistance of the load, $U_{dc}$ is a DC bus voltage, and D(k) is a duty cycle of a switch tube at the k-th sampling moment.

4. The multi-step current predictive control method of the bidirectional digital switching power amplifier of claim 1, wherein the corrected current prediction values at the k+1-th sampling moment and k+2-th sampling moment obtained by introducing the feedback correction term in the step 2 are:

$$i(k+1\mid k) = \left(1-\frac{T_S}{L}R\right)i(k) + (2D(k)-1)U_{dc}\frac{T_S}{L} + \lambda_1[i(k)-i(k\mid k-1)]$$

$$i(k+2\mid k) = \left(1-\frac{T_S}{L}R\right)i(k+1\mid k) + (2D(k)-1)U_{dc}\frac{T_S}{L} + \lambda_2[i(k)-i(k\mid k-1)]$$

wherein, $\lambda_1$, $\lambda_2$ are correction coefficients, i(k|k−1) is a current value at the k-th sampling moment predicted at the k−1-th sampling moment, i(k) is an output current sampling value at the k-th sampling moment, i(k+1|k) is a current value at the k+1-th sampling moment predicted at the k-th sampling moment, i(k+2|k) is a current value at the k+2-th sampling moment predicted at the k-th sampling moment, $T_S$ is a sampling period, L is an inductance of a load, R is a resistance of the load, $U_{dc}$ is a DC bus voltage, and D(k) is a duty cycle of a switch tube at the k-th sampling moment.

5. The multi-step current predictive control method of the bidirectional digital switching power amplifier of claim 1, wherein the value function in the step 3 is:

$$J=(i^*(k)-i(k+2\mid k))^2$$

wherein i*(k) is a current reference value at the k-th sampling moment, and i(k+2|k) is a current value at the k+2-th sampling moment predicted at the k-th sampling moment.

6. The multi-step current predictive control method of the bidirectional digital switching power amplifier of claim 1, wherein calculating an optimal modulation duty cycle in the step 3 specifically comprises:

firstly, substituting a current prediction value at the k+2-th sampling moment into the value function to obtain:

$$J = (i^*(k)) - \left(1-\frac{T_S}{L}R\right)i(k+1\mid k) + (2D(k)-1)U_{dc}\frac{T_S}{L} + \lambda_2[i(k)-i(k\mid k-1)])^2$$

secondly, calculating a derivative of value function J to D:

$$\frac{dJ}{dD} = \frac{d\{(i^*(k)) - \left(1-\frac{T_S}{L}R\right)i(k+1\mid k) + (2D(k)-1)U_{dc}\frac{T_S}{L} + \lambda_2[i(k)-i(k\mid k-1)])^2\}}{dD(k)}$$

finally, making the derivative of J to D equal to zero, and calculating a duty cycle D as the optimal duty cycle:

$$\frac{dJ}{dD} = 0$$

wherein a value range of the duty cycle D is $0 \leq D \leq 1$.

7. A bidirectional digital switching power amplifier, which is composed of a current prediction controller, a PWM modulator, a phase shifting circuit, a photoelectric isolation circuit, a driving circuit, a power conversion circuit, a current Hall sensor and a load; an input end of the current prediction controller is connected with a current given signal and a current feedback signal in a load fed back by the current Hall sensor, an output end of the current prediction controller is connected with an input end of the PWM modulator, an output end of the PWM modulator is connected with an input end of the phase shifting circuit, an output end of the phase shifting circuit is connected with an input end of the photoelectric isolation circuit, and an output end of the photoelectric isolation circuit is connected with an input end of the drive circuit, four-channel output ends of the drive circuit are respectively connected to a gate end of a first switch tube S1, a gate end of a second switch tube S2, a gate end of a third switch tube S3, and a gate end of a fourth switch tube S4, a drain end of the first switch tube S1 is simultaneously connected to a drain end of the third switch tube S3 and +$U_{dc}$ bus voltage, a source end of the first switch tube S1 is simultaneously connected to a drain end of the second switch tube S2 and one end of the current Hall sensor, the other end of the current Hall sensor is connected in series with one end of the load, a source end of the third switch tube S3 is simultaneously connected to a drain end of the fourth switch tube S4 and the other end of the load, a source end of the second switch tube S2 is simultaneously connected to a source end of the fourth switch tube S4 and a ground, an output end of the current Hall sensor is connected to the input end of the current prediction controller.

8. The bidirectional digital switching power amplifier of claim 7, wherein the power conversion circuit is composed of the switch tubes S1, S2, S3 and S4, all of which are power MOS tubes or IGBTs, drive signals of the switch tubes S1 and S2 are complementary, drive signals of the switch tubes S3 and S4 are complementary, a phase difference of drive signals of the switch tubes S1 and S4 is 180 degrees, and a phase difference of drive signals of the switch tubes S2 and S3 is 180 degrees.

9. The bidirectional digital switching power amplifier of claim 8, wherein loads driven by the bidirectional digital switching power amplifier are inductive loads.

* * * * *